(12) United States Patent
Charcranoon

(10) Patent No.: US 7,701,863 B2
(45) Date of Patent: Apr. 20, 2010

(54) DECENTRALIZED SLS MONITORING FOR THROUGHPUT IN A DIFFERENTIATED SERVICE ENVIRONMENT

(75) Inventor: Saravut Charcranoon, Richardson, TX (US)

(73) Assignee: Alcatel Lucent, Paris (FR)

( * ) Notice: Subject to any disclaimer, the term of this patent is extended or adjusted under 35 U.S.C. 154(b) by 1326 days.

(21) Appl. No.: 10/317,801

(22) Filed: Dec. 12, 2002

(65) Prior Publication Data

US 2004/0151117 A1    Aug. 5, 2004

(51) Int. Cl.
    *G01R 31/08* (2006.01)
(52) U.S. Cl. ...................................................... 370/252
(58) Field of Classification Search ......... 370/252–253, 370/392, 401, 229–240
    See application file for complete search history.

(56) References Cited

U.S. PATENT DOCUMENTS

| | | | |
|---|---|---|---|
| 6,112,236 A | 8/2000 | Dollin et al. | |
| 6,636,509 B1 * | 10/2003 | Hughes | 370/389 |
| 6,674,760 B1 * | 1/2004 | Walrand et al. | 370/411 |
| 7,058,051 B2 * | 6/2006 | Tsuruoka et al. | 370/388 |
| 7,254,114 B1 * | 8/2007 | Turner et al. | 370/244 |
| 2002/0038366 A1 | 3/2002 | Harasawa | |
| 2002/0055999 A1 * | 5/2002 | Takeda | 709/224 |
| 2002/0075802 A1 * | 6/2002 | Sugama et al. | 370/230.1 |
| 2002/0105911 A1 | 8/2002 | Pruthi et al. | |
| 2009/0046593 A1 * | 2/2009 | Ptasinski et al. | 370/252 |

FOREIGN PATENT DOCUMENTS

| | | |
|---|---|---|
| CA | 2200008 | 9/1998 |
| EP | 1152570 A | 11/2001 |
| GB | 2338372 A | 12/1999 |
| GB | 2 342 527 A | 4/2000 |
| GB | 2 355 901 A | 5/2001 |
| JP | 2000-196593 | 7/2000 |
| JP | 2001-053792 | 2/2001 |
| JP | 2001-069146 | 3/2001 |
| JP | 2001-127795 | 5/2001 |
| JP | 2001-148710 | 5/2001 |
| WO | WO 01/20825 A1 | 3/2001 |

OTHER PUBLICATIONS

J. Heinanen, Telia Finland, F. Baker, RFC 2597—Assured Forwarding PHB Group, Cisco Systems, Jun. 1999, pp. 1-8.*
V. Jacobson, K. Nichols, RFC 2598—An Expedited Forwarding PHB, Cisco Systems, Jun. 1999, pp. 1-8.*

(Continued)

*Primary Examiner*—Kwang B Yao
*Assistant Examiner*—Tung Q Tran
(74) *Attorney, Agent, or Firm*—Raymond M. Galasso; Galasso & Associates, L.P.

(57) ABSTRACT

A decentralized SLS monitoring structure (30) includes a measurement preparation and minimization module (32), measurement launching coordination module (34), measurement scheduler module (36) and measurement initialization and results module (38). The monitoring structure (30) prepares throughput tests to be performed on measurement engines (50), including a tapper (52) for splitting the data flow, packet collector (54) for time stamping packet headers, packet filter (56) for filtering packets according to a flow definition and packet recorder (58) for providing information to the measurement initialization and results module (38) for computing throughput.

6 Claims, 4 Drawing Sheets

OTHER PUBLICATIONS

B. Nandy, N. Seddigh, P. Pieda, Diffserv's Assured Forwarding PHB: What Assurance does the customer Have?, Nortel Networks, 1999, pp. 1-4.*

Hofmann, et al.; One-Way-Delay Measurements with CM Toolset; IPCCC 2000; pp. 41-47.

Kata, et al.; Actiev Measurement and analysis of Delay Time in the Internet; Waseda University; Apr. 1, 1999.

Black, et al.; Per Hop Behavior Identification Codes; IETF Network Working Group; RFC 3140: Jun. 2001.

Nichols, et al.; Definition of the Differentiated Services Field (DS Field) in the IPv4 and IPv6 Headers; IETF Network Working Group; RFC 2474; Dec. 1998.

* cited by examiner

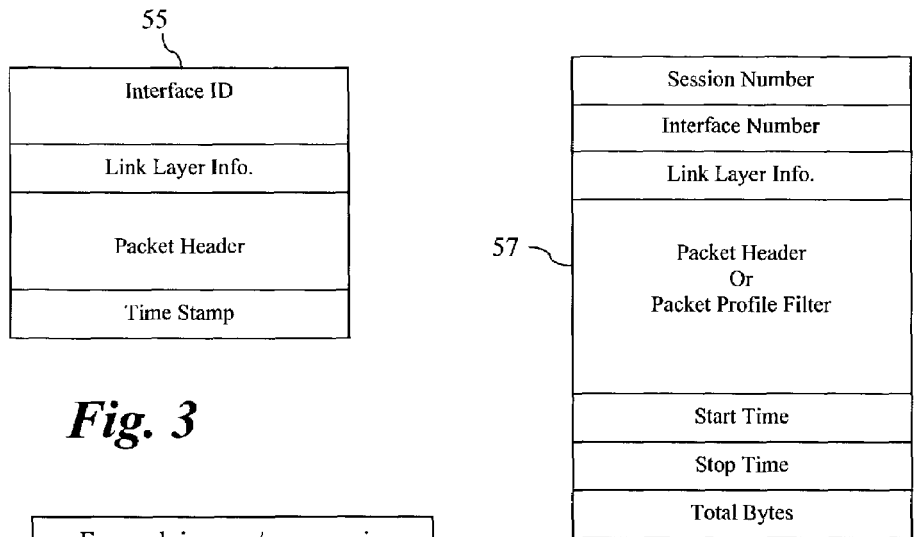
*Fig. 3*
*Fig. 4*
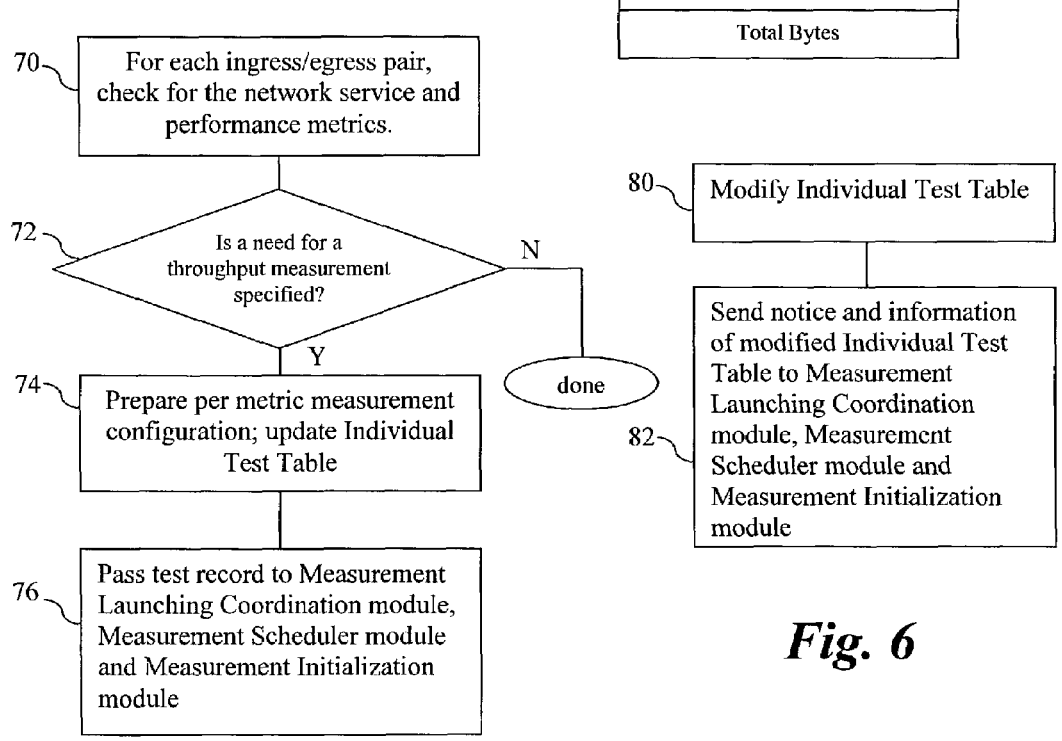
*Fig. 5*
*Fig. 6*

| Performance Metric \ Service Group | Throughput | Delay | Jitter | Packet Loss | Notes |
|---|---|---|---|---|---|
| EF-like service | Per SLS | Per SLS, Per SLS*, None | Per SLS, Per SLS*, None | Per SLS*, None | * w/ less stringent. |
| AF-like service | None Per SLS** | Per Service Per SLS** | None | Per Service | ** if value specified |

*Fig. 7*

| Test No. | SLS No. | Egress | Flow Definition | Filter Profile | Launching Schedule | Service Schedule | No of Sessions |
|---|---|---|---|---|---|---|---|
| 1 | | | | | | | |
| 2 | | | | | | | |
| 3 | | | | | | | |
| : | | | | | | | |
| M | | | | | | | |

*Fig. 8*

| PER-SLS \ EGRESS | SLS 1 | SLS 2 | SLS 3 | ... |
|---|---|---|---|---|
| A | (d,e,f) | | | |
| B | | | | |
| C | | | | |
| : | | | | |

Legend
d: flow definition
e: filter profile
f: service schedule

| Filter Profile Number | Filter Profile Description | Associated Flow Key | Status |
|---|---|---|---|
| 0 | Default Profile | None | Default |
| 1 | Profile 1 | Key 1 | Active |
| 2 | Profile 1 | Key 1 | Stand-By |
| 3 | Profile 2 | Key 2, Key3, Key 4 | Active |
| 4 | Profile 2 | Key 2, Key3, Key 4 | Stand-By |
| : | : | : | : |
| : | : | : | : |

Fig. 11

| Flow Key | Packet Header Record | Flow Start Time | Flow Last Seen Time | Waiting Period Expire Time | Continue Byte Counter | Start Byte Counter | Stop Byte Counter | Status | Session Number |
|---|---|---|---|---|---|---|---|---|---|
| Key 1 | | $T_{Start}(1)$ $T_{Start}(2)$ : $t_{Start}$ | $T_{Expire}(1)$ $T_{Expire}(2)$ : $t_{Last}$ | $T_{Expire}(1)$ $T_{Expire}(2)$ : $t_{Last}$ | $B_{Current}$ | $B_{Start}(1)$ $B_{Start}(2)$ : $B_{Start}(n)$ | $B_{Stop}(1)$ $B_{Stop}(2)$ : $B_{Current}$ | idle idle idle active | S S+1 : S+n-1 |
| Key 2 | | $t_{Start}$ | $t_{Last}$ | $t_{Last}$ | $B_{Current}$ | $B_{Start}$ | $B_{Current}$ | active | V |
| : | | : | : | : | : | : | : | : | : |
| Key n | | N/A | $T_{Expire}$ | N/A | $B_{Current}$ | N/A | N/A | inactive | N/A |
| : | | : | : | : | : | : | : | : | : |

| SLS Number | Flow Key | Session Number | Flow Filter Profile | Start Time | Stop Time | Total Bytes | Last Time Read |
|---|---|---|---|---|---|---|---|
| 1 | Key 1 | 17 | | $T_{Start}$ | $T_{Stop}$ | $B_{Total}$ | $T_{Read}$ |
| | | 18 | | : | : | : | |
| | | 19 | | : | : | : | |
| 2 | Key 2 | 12 | | $T_{Start}$ | $T_{Stop}$ | $B_{Total}$ | $T_{Read}$ |
| | Key 3 | : | | : | : | : | |
| 3 | Key 4 | 8 | | $T_{Start}$ | $T_{Stop}$ | $B_{Total}$ | $T_{Read}$ |
| 4 | Key 5 | 5 | | $T_{Start}$ | $T_{Stop}$ | $B_{Total}$ | $T_{Read}$ |
| : | : | : | | : | : | : | : |
| M | Key n-1 | 1 | | : | : | : | : |

Fig. 12

DECENTRALIZED SLS MONITORING FOR THROUGHPUT IN A DIFFERENTIATED SERVICE ENVIRONMENT

CROSS-REFERENCE TO RELATED APPLICATIONS

Not applicable

STATEMENT OF FEDERALLY SPONSORED RESEARCH OR DEVELOPMENT

Not applicable

BACKGROUND OF THE INVENTION

1. Technical Field

This invention relates in general to telecommunications and, more particularly, to service level specification (SLS) monitoring for throughput requirements.

2. Description of the Related Art

A Differentiated Service (DiffServ) network provides differentiated classes of service for Internet traffic, support various types of applications, and specific business requirements, as opposed to common Internet access, where there are no guarantees of specific performance. A service level specification (SLS) defines the parameters of services required from a Differentiated Service network. The SLS could specify, for example, maximum delays, delay variations and packet losses.

Monitoring actual conditions in a network involves a large number of measurement activities. One of the conditions that may be specified in an SLS is a throughput requirement. One-way throughput is generally defined as the number of user-packets successfully transferred in one direction over a unit of time. Currently, there is no standard for throughput measurement for SLS monitoring.

Therefore, a need has arisen for an efficient method and apparatus for throughput measurement for SLS monitoring in a differentiated service network.

BRIEF SUMMARY OF THE INVENTION

In the present invention, throughput is monitored in a packet-based network. A filter specification is defined, specifying a type of packet to be included in a throughput measurement. Packet headers records are generated for packets flowing into a node, where the packet header records include packet header information and an associated timestamp. The packet header records are filtered according to the filter specification and the throughput measurement is calculated based on packet header information from the filtered packet header records.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 3 illustrates the structure of a packet header record;

FIG. 4 illustrates the structure of a flow data record;

FIG. 5 illustrates is a flowchart for adding a new SLS;

FIG. 6 illustrates a flowchart for terminating an existing SLS;

FIG. 7 illustrates a Performance Measurement Granularity Table ("Granularity Table");

FIG. 8 illustrates a Per-Ingress Node Network Performance Metric Individual Test Table (hereinafter "Individual Test Table");

FIG. 9 illustrates a Measurement Activity Profile Table;

FIG. 10 illustrates a Flow Filter Profile Table;

FIG. 11 illustrates a Flow Data Update Table; and

FIG. 12 illustrates a Flow Record Table.

DETAILED DESCRIPTION OF THE INVENTION

The present invention is best understood in relation to FIGS. 1-12 of the drawings, like numerals being used for like elements of the various drawings.

Figure 1:
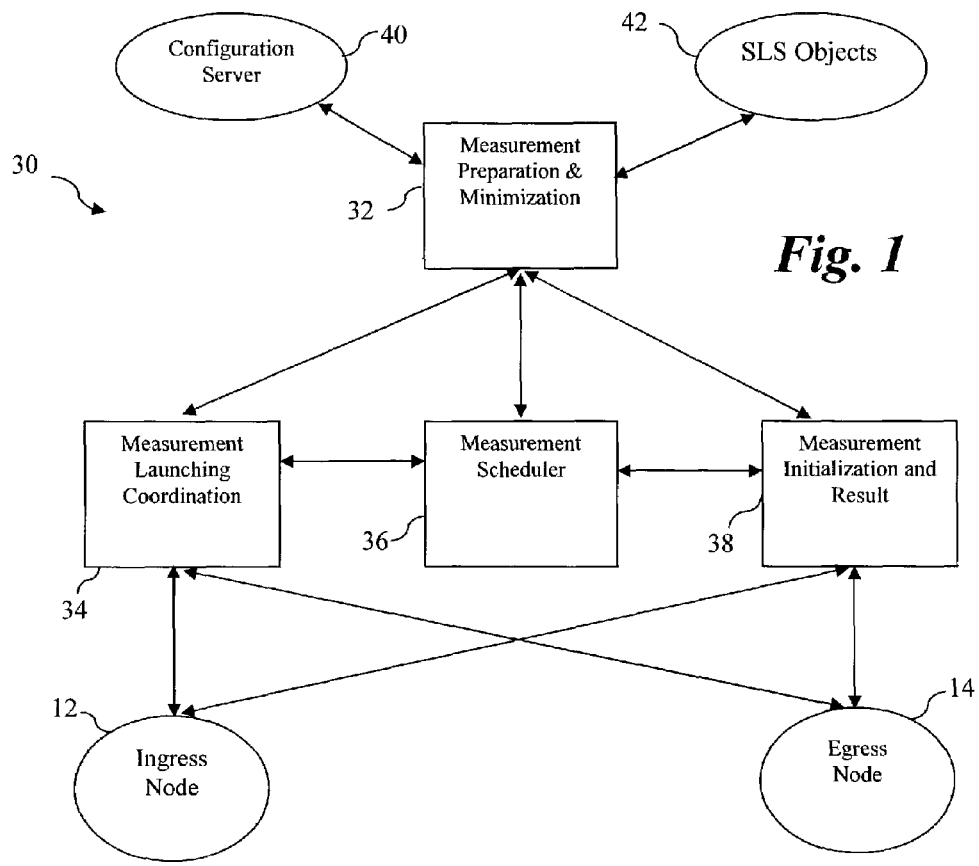
FIG. 1 illustrates a block diagram of a structure for decentralized SLS monitoring in a Differentiated Service network environment.

FIG. 1 illustrates a block diagram of a structure 30 for decentralized SLS monitoring in a Differentiated Service network environment. The decentralized SLS monitoring structure 30 includes a measurement preparation and minimization module 32, measurement launching coordination module 34, measurement scheduler module 36 and measurement initialization and result module 38. Configuration server 40 provides information regarding the test parameters for a given test and an SLS Objects database provides information on the SLS specification for a given SLA (service level agreement).

In operation, the measurement preparation and minimization module 32 scrutinizes an SLS specification to determine a number of one-way network performance measurements to be performed. Each one-way network performance measurement will be considered later for an appropriate configuration and a launching scheme. The measurement preparation and minimization module also provides a procedure to minimize a number of measurement sessions to only the ones necessary to be conducted. The information from the service characteristics and requirements specified in the SLS is used to group the SLS requests that share common features in deducing the minimization procedure.

The measurement scheduler module 36 keeps track of ongoing measurement activities. It maintains a number, type, and configuration of the one-way measurements to be conducted, as well as updates the measurement activity profile when there is a new measurement request or a measurement termination report.

The measurement initialization and result module 38 dispatches information regarding measurement configuration and test packet specification to all entities involved in an underlying measurement activity. This module may also maintain a database of the throughput measurement results.

The measurement launching coordination module 34 is responsible for a smooth and effective measurement operation by synchronizing a sending and receiving activities at both ending points of a measurement path.

The structure 30 of FIG. 1 is discussed in detail in connection with U.S. Ser. No. 10/307,182, entitled, "DECENTRALIZED SLS MONITORING IN A DIFFERENTIATED SERVICE ENVIRONMENT", to Charcranoon, filed Nov. 29, 2002, which is incorporated by reference herein. As discussed in detail in U.S. Ser. No. 10/307,182, this structure provides a decentralized solution to support SLS monitoring in a Differentiated Service Network. The structure 30 allows tests for SLS monitoring to be prepared by a central structure, and then sent to the appropriate ingress/egress node pairs for execution without intervention. The central structure 30 only needs to get involved if changes are made to the tests. The preparation and initiation of multiple tests (delay, delay variation, packet loss, and throughput) are handled by a single structure, rather than each being performed by a separate structure. The measurement activities are minimized while achieving effective and efficient measurements.

The present invention provides for measuring throughput in conjunction with SLS testing. Details on measuring delay, delay variation, and packet loss, can be found in U.S. Ser. No. 10/307,182, referenced above.

Figure 2:
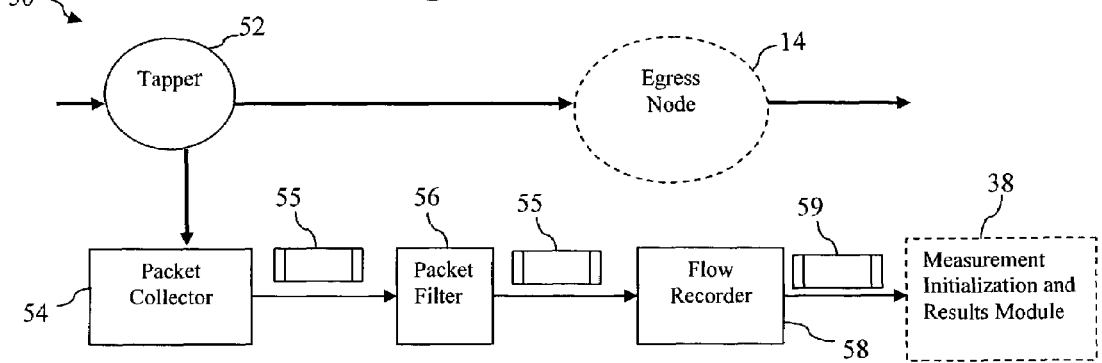
FIG. 2 illustrates a block diagram of a measurement engine for use in conjunction with the structure of FIG. 1 for measuring throughput.

FIG. 2 illustrates a block diagram of a measurement engine 50 which may be used in conjunction with the testing structure of FIG. 1 for throughput measurement. A tapper 52 receives the traffic intended for egress node 14. The tapper 52 copies or duplicates the traffic such that both the egress node 14 and packet collector 54 receive the data stream. The packet collector 54 copies headers from the packets and adds a time stamp to create a packet header record 55 (see FIG. 3). The packet collector passes packet header records to a packet filter 56, which matches information in the packet records to predefined flow definitions. For matching packets, packet header records 55 are passed to a flow recorder 58. The flow recorder 58 updates a Flow Data Update Table (see FIG. 11).

In operation, the tapper 52 allows the measurement engine 50 to receive a copy of the data stream being received by the egress node 14. The tapper 50 could be either a hardware or a software device. During initialization, the measurement initialization and result module 38 configures the packet filter 56 with flow filter profiles, discussed in greater detail below. The flow filter files determine which packets will be counted for a throughput measurement. The time periods for the measurement session are set and the flow recorder 58 is initialized.

During the measurement phase, the tapper 52 directs copies of the packets to the packet collector 54. The packet collector locates the beginning of each link data frame and extracts a packet form the link layer frame. If the entire packet is not received, it is discarded. Otherwise, the header of the packet is copied and placed in a packet header record 55 along with a time stamp, which indicates the time that the packet was received by the packet collector 54.

The packet record 55 is shown in FIG. 3. In the preferred embodiment, the packet header record 55 includes an interface ID field (indicating the physical interface that the measurement engine 50 monitors), a link layer information field (providing information regarding the link layer protocol, such as MAC address, ATM VCI/VPI, or the tunneling address), a packet header field (containing a copy of the packet header), and a time stamp field.

Returning again to FIG. 2, during the measurement phase, the packet filter 56 receives the packet header records 55 from the packet collector 54. Each packet header recorder 55 is compared to a flow filter profile to identify packets to be counted in a measurement. A unidirectional traffic stream can be defined with three attributes: (1) address, (2) service and (3) schedule.

With regard to address attributes, flow is mainly defined according to the specifications of user packets in an agreement with the network during an SLS establishment process. The agreement specifies which packets to be considered under the SLS coverage. Such a specification may come in various forms, for example:

(a) a combination of network layer addresses, transport layer addresses, and/or higher layer addresses, such as a complete or partial of the five-tuple (Source IP address, Destination IP address, Source Port, Destination Port, Protocol);

(b) a pair of network prefixes, e.g, (192.168.1.0/24, 135.207.119.0/24);

(c) a source network prefix and a list of destination network prefixes, or vice versa, e.g., (192.168.1.0/24, {135.207.119.0/24, 12.126.223.0/24}); or (d) a pair of a list of network prefixes, e.g., ({192.168.1.0/24, 192.205.31.0/24}, {135.207.119.0/24, 12.126.223.0/24}).

Service attributes could include a DSCP (DiffServ Code Point) number or any aggregate specification. The DSCP number is as defined in RFC 2474 of IETF (Internet Engineer Task Force). Unless otherwise noted, all RFCs cited herein refer to documents of the IETF and can be located at www.I-ETF.org/RFC.html. Schedule attributes could include a certain time period indicated by a service schedule specified in the SLS.

In order to identify if packets belonging to a flow, a flow filter profile must be given. Typically, the flow filter profile includes the address attributes and the service attribute given by the flow definition. It may also include the interface ID and the link layer protocol information. A flow filter profile may be defined by a procedure as a composition of a set of rules such as the one proposed in RFC 2722.

A flow time-out parameter determines when to terminate a flow. It may be defined as a maximum allowable idle time threshold, max_idleTime, which can be a static value or a dynamic value derived from other criteria. When no new packets arrive for a period of max_idleTime, such a flow is terminated.

If a packet comes within a flow definition, the packet header record 55 along with the matched flow key (see FIG. 10), is sent to the flow recorder 58.

The flow recorder 58 regularly updates each entry of the Flow Data Update table (discussed in greater detail in connection with FIG. 11). For an entry with a status that turns from "current" to "idle", the Flow_Stop_Time to the Flow_Last_Seen_Time are set and the flow data record is generated according to the entry information.

A preferred embodiment for the flow data record 59 is shown in FIG. 4. The flow record 59 contains the information needed for later SLS throughput statistics computation. Information is maintained in a Flow Record table, described in connection with FIG. 12. The session number field specifies the session associated with the record. The interface number field, link layer information field and packet header field are from the associated packet header record (in some cases the information regarding the packet filter provile is a subset of the packet header itself, and may be stored to reduce the information maintained in the records). The start time, stop time and total bytes fields are used to calculate the throughput. The start time together with the stop time define a single measurement session.

When checking the status of a flow entry responsive to receiving a packet header record 55, if the status of the flow entry is "idle", the Flow_Start_Time and Flow_Last_Seen_Time are set to the time stamp in the received packet header record 55 and the Session Number counter is advanced; the status field is set to "current". If the status is "current", the Flow_Last_Seen_Time is set to the time stamp of the packet header record 55. If the status of the entry is "inactive", the status is returned to "current", the Flow_Start_Time and Flow_Last_Seen_Time is set to the time-stamp of the packet header record 55 and the Session Number counter is advanced.

In each case, the Continue Byte counter and Stop Byte counter are advanced in accordance with the packet size. The Total Byte counter is updated when the flow entry status turns to the "idle" state.

If a packet flow filter is not longer in use, the associated entry may be removed or the status may be set to "inactive" and the Session Number and Total Byte counters are set to zero.

FIGS. 5 through 8 illustrate the operation of the measurement preparation and minimization module 32. FIG. 5 is a flowchart for adding a new SLS. FIG. 6 is a flowchart for terminating an existing SLS by the Measurement Preparation and minimization module 32. FIG. 7 illustrates a Performance Measurement Granularity Table (hereinafter, "Granularity Table") 60. FIG. 8 illustrates a Per-Ingress Node Performance Metric Individual Test Table (hereinafter "Individual Test Table") 62 that includes parameters for each test for each SLS.

Referring to FIG. 5, in step 70, the network service and performance metrics are determined. In step 72, the Granularity Table 60 is referenced to map the requirements of the new SLS to the test parameters in the Configuration Server 40. The Granularity Table 60 provides a list of variations for each test for both AF (Assured Forwarding) and EF (Expedited Forwarding) like services (a given SLS could have AF or EF specifications, or both). In general, in an AF-like service, resources are shared between users, while in a EF-like service, resources are allocated per user. Thus, in a given SLS, there may or may not be a throughput measurement specified.

In step 74, a measurement configuration is prepared for each specified metric, including packet specification, launching schedule, as well as a number of launches. The Individual Test Table 62 is updated with the new test parameters for the new SLS. In step 76, the test record is passed to the Measurement Launching Coordination module 34, Measurement Scheduler module 36 and Measurement Initialization and Result module 38.

FIG. 6 illustrates a flow chart for terminating an SLS. In step 80, the Individual Test Table 62 is modified to reflect the terminated tests and in step 82, the change in test records is passed to the Measurement Launching Coordination module 34, Measurement Scheduler module 36 and Measurement Initialization and Result module 38.

The Measurement Scheduler module 36 maintains a Measurement Activity Profile Table 88, shown in FIG. 9, that contains information about types of measurement activities and their details, to be performed at each ingress node. The Measurement Activity Profile Table 88 uses the information obtained in the Granularity Table 50 to consolidate the same type of measurements, thus minimizing the number of measurement activities. In addition, the Measurement Scheduler module 36 adjusts the measurement scheduling configuration in response to external changes and topological changes.

In response to a new measurement request, a new column is provided in the Measurement Activity Table 88 for each SLS request. Information regarding the request is placed within the new column. In response to a measurement termination, relevant entries and corresponding column in the Measurement Activity Table 88 are deleted. The Measurement Launching Coordination module 34 and Measurement Initialization and Result module 38 are notified of the deletion. In response to a topology change (i.e., a change in egress node), relevant entries in the Measurement Activity Table 88 are modified to reflect the change.

The Measurement Initialization and Result Module 38 maintains three tables with respect to throughput measurement. A Flow Filter Profile table 90, shown in FIG. 10 maintains an array of filter profiles used to match the incoming packet header record so as to identify the associated flow(s). The Filter Profile Description field specifies all attributes that need to be matched for a packet to belong to a flow. This description may come in a form of rule set as given in RFC2722. The Associated Flow Key field is used as a pointer to an entry in the Flow Data Update table (FIG. 11). The Status field indicates a preference of the Filter Profile Description. An "active" filter profile description is to be used as the first preference while the "stand-by" filter profile description is intended for unusual situations such as a heavy traffic period, and a congested period. The first row of the table 90 is a default profile filter used for system operational purposes.

FIG. 11 illustrates the Flow Data Update Table 92. The Flow Data Update Table maintains data resulting from a flow matching. Its main purpose is to maintain the count of bytes or packets of the flow as well as maintaining flow information and state of the flow itself.

Referring to the fields of the Flow Data Update Table 92, the Flow Key field includes a unique pointer to a table entry. The Status field for each flow can be current, idle, and inactive. The "current" state indicates that the flow is active and packets belonging to the flow have been seen recently. The "idle" state indicates that the flow is active but no packets of such a flow have been seen for at least a period of time of a maximum allowable idle time threshold, i.e., max_idleTime. Finally the "inactive" state indicates of no related packet activities of the flow taken place but the flow record is not deleted. The inactive state occurs after a flow with a status "idle" has been read out and there is no new packet coming. The Session Number field indicates the current number of sessions being measured so far. A "session" is defined as a time interval between a flow start and the flow stop. The Flow Start Time field store the time that the first packet of the flow of each session is observed. The Flow Last Seen field stores the time that the last packet of the flow is observed. The Waiting Period Expire Time field stores the time after which the status of the entry is turned to "idle" and the current session ends. This time is a summation of the Flow Last Seen Time and the max_idleTime. The time information from the three counters (Flow_Start_Time, Flow_Last_Seen_Time, and Waiting_Period_Expire_Time) are recorded before a new session begins.

The Continue Byte Counter counts a number of bytes measured so far, extending over a number of sessions. Normally it would not be reset unless there is a management purpose or the counter wraps around. The Start Byte Counter and Stop Byte Counter maintain the byte count at the start time and stop time of the underlying session, respectively. Both the Start Byte counter and Stop Byte counter are set to the value of the Continue Byte Counter when a new session starts. Each new packet size of the flow advances both the Continue Byte Counter and the Stop Counter. When the session stops, the figure in the Stop Byte Counter is recorded for computing total bytes in the session. The Last Time Read field marks the last time the entry of such a flow is read.

FIG. 12 illustrates a Flow Record Table 94. The Flow Record table 94 maintains measurement results in term of the total bytes of each throughput measurement session. The Measurement Initialization and Result Module 38 uploads entries in the Flow Data Update table that have a "idle" status, and computes the resulting total bytes. The Start Time field and the Stop time field are taken from the $T_{start}$ and the $T_{Expire}$ of the Flow Data Update table 92, respectively. The Total Bytes field is obtained from $(B_{stop} - B_{start})$ of the Flow Data Update Table 92.

While the invention has been described herein specifically for the throughput measurement, the teachings of this invention could be combined with the teachings of U.S. Ser. No. 10/307,182, referenced above, to handle multiple measurements including the throughput measurement.

The invention offers a unified and efficient structure for measuring end-to-end per-class one-way throughput on multiple egress nodes. The solution supports SLS monitoring for quality of service support and supports a network usage accounting on a per-class basis in Differentiated Service networks. By administering throughput measurements from a central structure, but allowing separate and independent execution of the measurements at the measurement engines at the egress nodes, a more effective and efficient measurement is obtained. The solution is scalable, since measurements are executed in a decentralized manner, in addition to passive measurements (i.e., no test packets are injected into the data stream). The invention may be used to support dynamic aggregation levels of granularity for a per-class measurement.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A measurement engine configured for use in a decentralized service level specification (SLS) monitoring device, with the SLS monitoring device including measurement initialization and result module, said measurement engine comprising:
   a tapper connected to an egress node and a packet collector, said tapper configured to receive a data stream with the data stream including data packets, said tapper further configured to copy the data stream and further configured to send the data stream to each of said egress node and said packet collector, said tapper further configured to determine if a received data packet from the received data stream is complete and to discard the received data packet if the determination is made that the data packet was not complete;
   said packet collector configured to copy headers from the data packets from the received data stream, said packet collector further configured to add a time stamp to create at least one packet header record;
   a packet filter connected to said packet collector, said packet collector further for passing said at least one packet header record to said packet filter, said packet filter for comparing said received at least one packet header record with predefined definitions; and
   a flow recorder connected to said packet filter, said packet filter configured to send said at least one packet header record to said flow recorder if the comparison of said at least one packet header record with the predefined definitions is a match;
   wherein the packet collector is configured to locate a beginning of each one of a plurality of link data frames of the data stream, to extract a packet therefrom thereby providing said data packets, and to place a copy of a header of each one of said data packets in a respective packet header record along with the time stamp and wherein the time stamp indicates a time that the packet was received by the packet collector;
   wherein the packet header record includes an interface ID field indicating a physical interface that the measurement engine monitors, a link layer information field that provides information regarding a link layer protocol, a packet header field containing the copy of the packet header, and a time stamp field having the time stamp stored therein.

2. The measurement engine as recited in claim 1, wherein the time stamp added by said packet collector indicating the time the data packed was received by said tapper.

3. The measurement engine as recited in claim 2, wherein the data packet header includes at least one of an interface identification field, a link layer information field, a time stamp filed.

4. The measurement engine as recited in claim 1, wherein the packet falter includes a flow filter profile used thereby to determine which ones of said data packets will be counted for a throughput measurement.

5. The measurement engine as recited in claim 4, wherein the filter profile is used to match a header record of at least a portion of said data packets to an associated traffic flow.

6. The measurement engine as recited in claim 5 wherein, a filter profile description field of the filter profile specifies all attributes needed for matching one of said data packets to an associated traffic flow.

* * * * *